No. 889,868. PATENTED JUNE 2, 1908.
J. S. BARNES.
GEARING.
APPLICATION FILED JULY 12, 1907.
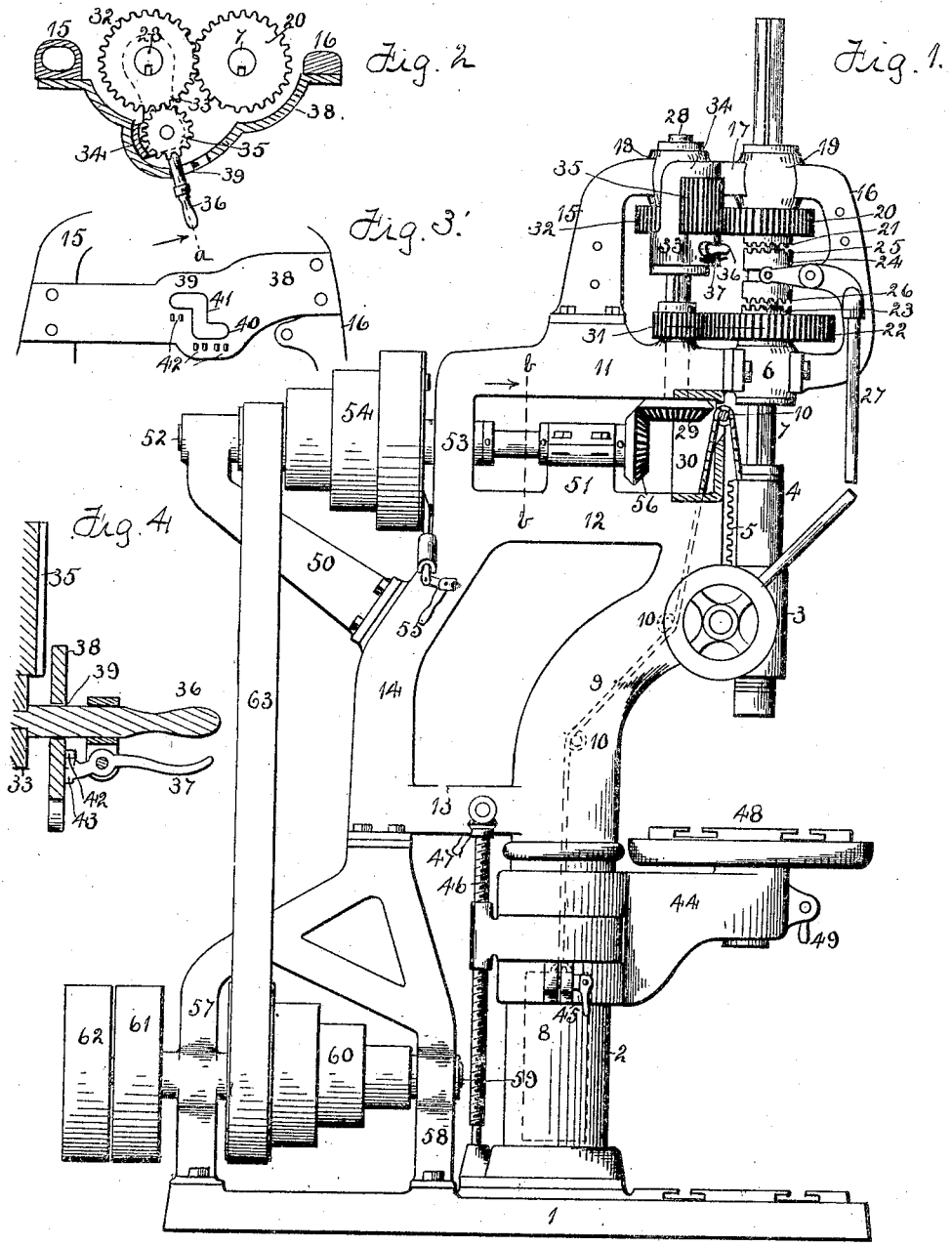
Witnesses:
J. S. Clark
E. Behel
Inventor:
John S. Barnes
By A. O. Behel
Atty.

UNITED STATES PATENT OFFICE.

JOHN S. BARNES, OF ROCKFORD, ILLINOIS, ASSIGNOR TO W. F. & JOHN BARNES COMPANY, OF ROCKFORD, ILLINOIS, A CORPORATION OF ILLINOIS.

GEARING.

No. 889,868.　　Specification of Letters Patent.　　Patented June 2, 1908.

Application filed July 12, 1907. Serial No. 383,530.

*To all whom it may concern:*

Be it known that I, JOHN S. BARNES, a citizen of the United States, residing at Rockford, in the county of Winnebago and State of Illinois, have invented certain new and useful Improvements in Gearing, of which the following is a specification.

The object of this invention is to construct a heavy duty speed mechanism, a tapping mechanism and an increased speed mechanism for the drill spindle, said mechanisms driven through a shaft located parallel with the drill spindle, and located in rear of the spindle in order that the operative parts will be in the same vertical plane thereby producing a well balanced machine.

In the accompanying drawings, Figure 1 is a side elevation of a drilling machine containing my improvements. Fig. 2 is a transverse section of the upper portion of the frame showing the tapping and increased speed mechanism. Fig. 3 is a face representation of a plate acting as a support for the lever employed to transfer the driving mechanism from the increased speed mechanism to the tapping mechanism. Fig. 4 is a vertical section on dotted line *a* Fig. 2. Fig. 5 is a vertical section on dotted line *b b* Fig. 1.

To the base 1 is connected a vertically arranged column 2, its upper portion formed with a bearing 3, within which is located a sleeve 4 in a manner to be reciprocated by a pinion, not shown, engaging the teeth of the rack 5. Above the bearing 3, is located a bearing 6, which guides a drill spindle 7 connected to the sleeve 4 in a manner to be revolved independently of the sleeve, but when the sleeve is reciprocated it will carry the drill spindle with it. The vertical column 2 is hollow, and within it is located a weight 8 and a cable 9 passes over the pulleys 10, and has one end connected to the weight 8, and its other end to the bearing 3, which serves to counterbalance the weight of the sleeve 4 and drill spindle 7.

From the upper portion of the column 2 extend rearwardly three branches 11, 12 and 13, which are formed a part of the rear brace 14. A bracket composed of the vertical sections 15 and 16 and horizontal section 17, has the section 15 connected to the branch 11, and the section 16 connected to the bearing 6. The section 17 is provided with two bearings 18 and 19. The bearing 19 supports a spur gear 20, through which the drill spindle 7 passes. This spur gear 20 has a clutch face 21. The bearing 6 supports a spur gear 22 which is provided with a clutch face 23. To the drill spindle 7 is splined a clutch section 24 provided with two clutch faces 25 and 26. A shipping lever 27 has a connection with the clutch section.

A supplemental shaft 28 is supported by the bearing 18 in the horizontal section 17, and in a bearing formed in the branch 11. To the lower end of this shaft 28 is connected a bevel gear 29, which is located between the branches 11 and 12, and is partly inclosed by the side plates 30, connecting the branches 11 and 12. A spur pinion 31 is connected to the shaft 28 so as to rotate therewith. A spur gear 32 has a splined connection with the shaft 28 in order that it may be moved in the lengthwise direction of the shaft and at the same time be rotated thereby. A support 33 has a connection with the spur gear 32 in a manner to move the spur gear when it is moved. From this support 33 extends an overhanging arm 34. A spur pinion 35 is supported between the overhanging arm 34 and the support 33 in a manner to rotate idly. From the support 33 extends a handle 36, to which is pivoted a thumb lever 37.

A plate 38 is adapted to be connected to the sections 15 and 16 and is removed from Fig. 1 of the drawings to more clearly show the other parts. This plate is provided with an irregular shaped opening comprising the upper horizontal section 39 and lower section 40 connected by the vertical section 41. The handle 36 extends through this irregular shaped opening and is movable along the different sections thereof. Beneath each section of the irregular shaped opening are located two projections 42. Between the projections of a pair the end 43 of the thumb lever 37 may be placed, which will hold the handle from further movement. The spur pinion 35 and spur gear 32 are always in mesh. When the handle 36 is located on the upper section 39, the spur gear 32 will be in mesh with the spur gear 20. When the handle is located in the lower end of the vertical section 41, the spur gear 32 will be dropped down out of mesh with the spur gear 20. When the handle is at the right hand end of the lower section 40, the spur pinion 35 will be in mesh with the spur gear 20 and, as the pinion is always in mesh with the spur gear 31 the spur gear 20 will be rotated in a direction opposite to that when rotated by the spur gear 32.

A rotary motion is imparted to the bevel gear 29 by means to be hereinafter described, which will also rotate the shaft 28 and the spur gears 31 and 32. The spur gear 31 being in mesh with the spur gear 22, the spur gear will be constantly rotated. In doing heavy work the spur gear 32 and pinion 33 are held disengaged from the spur gear 20. The clutch section 24 is moved down by the shipping lever so that its clutch face 26 will engage the clutch face 23 of the spur gear 22, thereby forming a rotative connection between the spur gear 22 and the drill spindle 7. When the clutch face 25 of the clutch section 24 is in engagement with the clutch face 21 of the spur gear 20, and the spur gear 32 is in mesh with the spur gear 20, a driving connection is formed between the shaft 28 and the drill spindle 7, but at an increased speed, which is used for light work. By dropping the spur gear 32 out of mesh with the spur gear 20 and moving the pinion 35 into mesh with the spur-gear 20, a rotative connection is formed between the shaft 28 and drill spindle 7, but in a reverse direction from that imparted to it by the spur gears 31 and 32. This movement is used for tapping.

Around the vertical column 2 is located a bracket 44 and clamped in connection therewith by the lever 45. This bracket is raised and lowered by the screw 46 which is operated by the crank 47. A table 48 is supported by the bracket 44 and is clamped in connection therewith by the lever 49. To the rear brace 14 is secured a bracket 50 and from the upper face of the branch 12 extends a bearing 51. A main driving shaft 52 is supported by the bracket 50, the bearing 51 and an intermediate bearing 53. A cone pulley 54 is adapted to be connected with the main driving shaft 52 through the direct and back gearing usually employed, and connections being formed by manipulating the lever 55. A bevel gear 56 is fixedly connected with the main driving shaft and meshes with the bevel gear 29 connected to the shaft 28. To the lower end of the rear brace 14 is connected a forked frame composed of the branches 57 and 58, their lower ends connected to the base 1. A counter shaft 59 is supported in bearings formed in the branches 57 and 58. A cone pulley 60 and a tight pulley 61 has a driving connection with the counter shaft, and a loose pulley 62 is loosely supported by the counter shaft. A belt 63 forms a driving connection between the two cone pulleys 54 and 60.

By this construction of a drilling machine, the drill spindle 7, shaft 28, driving shaft 52 and counter shaft 59 are all located in the same vertical plane thereby producing a drill having the least side projections, and the arrangements of the various sections of the frame serve to impart strength in the direction of the greatest strain.

I claim as my invention.

1. In a drilling machine, in combination, a suitable frame, a vertically arranged drill spindle, a supplemental shaft, a gear connection between the supplemental shaft and drill spindle, a driving shaft, and a driving connection between the driving shaft and supplemental shaft, the drill spindle, supplemental shaft and driving shaft located in substantially the same plane.

2. In a drilling machine, in combination, a suitable frame, a vertically arranged drill spindle, a supplemental shaft, a forward gear connection between the supplemental shaft and drill spindle, a reverse gear connection between the supplemental shaft and drill spindle, a driving shaft, and a gear connection between the driving shaft and supplemental shaft, the drill spindle, supplemental shaft and driving shaft located in substantially the same plane.

3. In a drilling machine, in combination, a suitable frame, a vertically arranged drill spindle, a supplemental shaft, a gear connection between the supplemental shaft and drill spindle, a driving shaft, a driving connection between the driving shaft and supplemental shaft, a counter shaft, and a driving connection between the counter shaft and driving shaft, the drill spindle, supplemental shaft, driving shaft and counter shaft located in substantially the same plane.

4. In a drilling machine, in combination, a suitable frame, a vertically arranged drill spindle, a supplemental shaft, a spur gear loosely mounted on the drill spindle and having a clutch face, a spur gear fixedly connected with the supplemental shaft and in constant mesh with the gear on the drill spindle, another spur gear loosely mounted on the drill spindle and having a clutch face, a double faced clutch slidably connected to the drill spindle, gearing for forming a forward and reverse connection between the supplemental shaft and last mentioned gear on the drill spindle, a driving shaft, and a driving connection between the supplemental shaft and the driving shaft.

5. In a drilling machine, in combination, a suitable frame, a vertically arranged drill spindle, a supplemental shaft, a gear rotatably connected with the supplemental shaft, a gear adapted to have a driving connection with the drill spindle, an intermediate gear in constant mesh with the gear on the supplemental shaft, means for moving the intermediate gear into mesh with the gear for the drill spindle, a driving shaft, and a driving connection between the driving shaft and supplemental shaft.

6. In a drilling machine, in combination, a suitable frame, a vertically arranged drill spindle, a supplemental shaft, a gear rotatably connected with the supplemental shaft and bodily movable in the lengthwise direction thereof, a gear adapted to have a driving connection with the drill spindle, means for moving the gear on the supplemental shaft out of and into mesh with the gear for the drill spindle, an intermediate gear adapted to connect the gear on the supplemental shaft and the gear on the drill spindle, a driving shaft, and a driving connection between the driving shaft and supplemental shaft.

7. In a drilling machine, in combination, a frame composed of two rearwardly extending branches and a vertically arranged column, a drill spindle supported by the upper portion of the column, a bearing extending upward from the lower branch, a supplemental shaft having a bearing in the upper branch, a gear connection between the supplemental shaft and drill spindle, a driving shaft supported in the above mentioned bearing, and a driving connection between the driving shaft and supplemental shaft.

8. In a drilling machine, in combination, a frame composed of two rearwardly extending branches and a vertically arranged column, a drill spindle supported by the upper portion of the column, a bearing located between the branches, a supplemental shaft having a bearing in the upper branch, a gear connection between the supplemental shaft and drill spindle, a driving shaft supported in the above mentioned bearing, and a driving connection between the driving shaft and supplemental shaft.

9. In a drilling machine, in combination, a frame composed of two rearwardly extending branches and a vertically arranged column, a drill spindle supported by the upper portion of the column, a bearing extending from one of the branches, a supplemental shaft having a bearing in the upper branch, a gear connection between the supplemental shaft and drill spindle, a driving shaft supported in the above mentioned bearing, and a driving connection between the driving shaft and supplemental shaft.

10. A frame for drilling machines, comprising a base, a vertically arranged column having three substantially horizontal branches extending rearward therefrom, and a rear brace connecting the branches, a separate bracket connected to the rear brace and extending upward and rearwardly therefrom, and a separable forked bracket connected to the base and to the rear brace.

11. In a drilling machine, in combination, a suitable frame, a separable bracket connected to the upper portion of the frame, a vertically arranged drill spindle and supplemental shaft supported by the frame and bracket, a forward gear connection between the supplemental shaft and drill spindle, a reverse gear connection between the supplemental shaft and drill spindle, a driving shaft, and a driving connection between the driving shaft and supplemental shaft.

12. In a drilling machine, in combination, a suitable frame, a detachable bearing connected to the upper portion of the frame, a vertically arranged drill spindle supported in the detachable bearing, a bracket connected to the upper portion of the frame and to the detachable bearing, the drill spindle located in a bearing in the bracket, a supplemental shaft located parallel with the drill spindle and supported by the frame and bracket, a forward driving gear and a reverse gear connection between the supplemental shaft and drill spindle, a driving shaft, and a driving connection between the driving shaft and supplemental shaft 13. In a drilling machine, in combination, a suitable frame, a detachable bearing connected to the upper portion of the frame, a vertically arranged drill spindle supported in the detachable bearing, a bracket connected to the upper portion of the frame and to the detachable bearing, the drill spindle located in a bearing in the bracket, a supplemental shaft located parallel with the drill spindle and supported by the frame and bracket, two forward driving and a reverse gear connection between the supplemental shaft and drill spindle, a driving shaft, and a driving connection between the driving shaft and supplemental shaft.

14. In a drilling machine, in combination, a suitable frame, a vertically arranged drill spindle, a supplemental shaft, a gear rotatably connected with the supplemental shaft, a gear adapted to have a driving connection with the drill spindle, an intermediate gear in constant mesh with the gear on the supplemental shaft, means for moving the gear on the supplemental shaft into and out of mesh with the gear for the drill spindle and for moving the intermediate gear into and out of mesh with the gear for the drill spindle, a driving shaft, and a driving connection between the driving and supplemental shafts.

15. In a drilling machine, in combination, a suitable frame, a vertically arranged drill spindle, a supplemental shaft, a gear rotatably connected with the supplemental shaft, a gear adapted to have a driving connection with the drill spindle, an intermediate gear in constant mesh with the gear on the supplemental shaft, a support for the intermediate gear and the gear connected with the supplemental shaft and having a slidable engagement with the supplemental shaft, means for moving the support to place the intermediate gear or the gear on the supplemental shaft in mesh with the gear on the drill spindle, a driving shaft, and a driving connection between the driving and supplemental shafts.

16. In a drilling machine, in combination, a suitable frame, a vertically arranged drill spindle, a supplemental shaft, a gear rotatably connected with the supplemental shaft, a gear adapted to have a driving connection with the drill spindle, an intermediate gear in constant mesh with the gear on the supplemental shaft, a support for the intermediate gear and the gear connected with the supplemental shaft and having a slidable engagement with the supplemental shaft, a handle for moving the support to place the intermediate gear and the gear on the supplemental shaft in mesh with the gear on the drill spindle, means for locking the handle against movement, a driving shaft, and a driving connection between the driving and supplemental shafts.

17. In a drilling machine, in combination, a suitable frame, a vertically arranged drill spindle, a supplemental shaft, a gear rotatably connected with the supplemental shaft, a gear adapted to have a driving connection with the drill spindle, an intermediate gear in constant mesh with the gear on the supplemental shaft, a support for the intermediate gear and the gear connected with the supplemental shaft and having a sliding engagement with the supplemental shaft, a handle for moving the support to place the intermediate gear and the gear on the supplemental shaft in mesh with the gear on the drill spindle, a plate provided with an irregular shaped opening through which the handle projects, means for locking the handle to the plate, a driving shaft, and a driving connection between the driving and supplemental shafts.

18. In a drilling machine, in combination, a suitable frame, a vertically arranged drill spindle, a supplemental shaft, a gear connection between the drill spindle and supplemental shaft, one of the gears adapted to be moved out of mesh with the other gear, an intermediate gear adapted to mesh with both of said gears, a driving shaft, and a driving connection between the driving shaft and supplemental shaft.

In testimony whereof I have hereunto set my hand in presence of two subscribing witnesses.

JOHN S. BARNES.

Witnesses:
A. O. BEHEL,
E. D. E. N. BEHEL.